United States Patent
Haimovich et al.

(10) Patent No.: US 11,271,865 B1
(45) Date of Patent: Mar. 8, 2022

(54) RESOURCE POPULARITY ASSESSMENT AND UTILIZATION

(71) Applicant: Microsoft Technology Licensing, LLC, Redmond, WA (US)

(72) Inventors: Tomer Haimovich, Tel Aviv (IL); Noa Esther Aviv Hamamy, Tel Aviv (IL); Jonatan Zukerman, Kiryat Ono (IL); Dror Cohen, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/109,416

(22) Filed: Dec. 2, 2020

(51) Int. Cl.
*H04L 12/911* (2013.01)
*H04L 12/26* (2006.01)
*H04L 12/923* (2013.01)
*H04L 47/78* (2022.01)
*H04L 43/0882* (2022.01)
*H04L 43/0805* (2022.01)
*H04L 47/762* (2022.01)
(Continued)

(52) U.S. Cl.
CPC ............ *H04L 47/781* (2013.01); *H04L 43/08* (2013.01); *H04L 43/0805* (2013.01); *H04L 43/0876* (2013.01); *H04L 43/0882* (2013.01); *H04L 47/762* (2013.01)

(58) Field of Classification Search
CPC ... H04L 47/781; H04L 43/0876; H04L 43/08; H04L 47/762; H04L 43/0882; H04L 43/0805; H04L 41/5009; H04L 41/5012; H04L 41/5016; H04L 41/5035
See application file for complete search history.

(56) References Cited

U.S. PATENT DOCUMENTS

| 7,526,459 B2* | 4/2009 | Flinn | G06N 5/048 |
| | | | 706/12 |
| 8,887,166 B2* | 11/2014 | Gerovac | H04L 67/32 |
| | | | 718/104 |

(Continued)

OTHER PUBLICATIONS

"How to investigate anomaly detection alerts", retrieved from <<https://docs.microsoft.com/en-us/cloud-app-security/investigate-anomaly-alerts>>, Jun. 8, 2020, 25 pages.

(Continued)

*Primary Examiner* — Patrice L Winder
(74) *Attorney, Agent, or Firm* — Ogilvie Law Firm

(57) ABSTRACT

Computing environment resource popularity is assessed, using a computed ratio of accumulations of resource usage values and a relationship condition, thereby providing inputs as guidance for automatic system enhancement utilizations such as anomaly detection, resource management, and access or maintenance prioritization. Unlike V1 approaches that base resource popularity on at most two resource usage values, the V2 assessment approaches taught herein consider a distribution of usage values across an entire group of resources, thereby providing finer grained actionable results. Usage value accumulations may be scaled. Popularity or rareness of one or more resources of various types may be determined. A cache or other decay model may be employed to optimize assessment efficiency by reducing usage value retrieval I/O transactions. Specific utilizations of resource popularity assessments for enhancing system usability, security, functionality, and effectiveness are discussed.

20 Claims, 4 Drawing Sheets

(51) Int. Cl.
*H04L 43/08* (2022.01)
*H04L 43/0876* (2022.01)

(56) References Cited

U.S. PATENT DOCUMENTS

| | | | |
|---|---|---|---|
| 9,317,404 B1* | 4/2016 | Cohen | G06F 9/44589 |
| 9,413,818 B2* | 8/2016 | Abuelsaad | H04L 43/08 |
| 9,516,053 B1* | 12/2016 | Muddu | H04L 63/1433 |
| 9,749,206 B2* | 8/2017 | Jung | H04W 12/02 |
| 9,774,613 B2* | 9/2017 | Thomas | H04L 63/20 |
| 10,140,327 B2* | 11/2018 | Elkherj | G06Q 30/0271 |
| 10,348,637 B1* | 7/2019 | McNair | H04L 43/0876 |
| 10,361,924 B2* | 7/2019 | Baughman | H04L 41/145 |
| 10,547,521 B1* | 1/2020 | Roy | H04L 43/06 |
| 10,592,328 B1* | 3/2020 | Thompson | H04L 41/0893 |
| 2005/0015544 A1 | 1/2005 | Zohar et al. | |
| 2005/0015546 A1 | 1/2005 | Zohar et al. | |
| 2005/0015554 A1 | 1/2005 | Zohar et al. | |
| 2005/0015566 A1 | 1/2005 | Zohar et al. | |
| 2005/0015567 A1 | 1/2005 | Zohar et al. | |
| 2005/0015658 A1 | 1/2005 | Zohar et al. | |
| 2005/0102469 A1 | 5/2005 | Zohar et al. | |
| 2005/0102554 A1 | 5/2005 | Zohar et al. | |
| 2005/0154800 A1 | 7/2005 | Zohar et al. | |
| 2005/0257082 A1 | 11/2005 | Zohar et al. | |
| 2006/0031635 A1 | 2/2006 | Zohar et al. | |
| 2006/0090036 A1 | 4/2006 | Zohar et al. | |
| 2006/0090050 A1 | 4/2006 | Zohar et al. | |
| 2006/0107097 A1 | 5/2006 | Zohar et al. | |
| 2006/0129783 A1 | 6/2006 | Zohar et al. | |
| 2006/0143383 A1 | 6/2006 | Zohar et al. | |
| 2006/0143395 A1 | 6/2006 | Zohar et al. | |
| 2006/0200456 A1 | 9/2006 | Zohar et al. | |
| 2006/0214936 A1 | 9/2006 | Zohar et al. | |
| 2006/0253670 A1 | 11/2006 | Zohar et al. | |
| 2006/0253674 A1 | 11/2006 | Zohar et al. | |
| 2006/0253681 A1 | 11/2006 | Zohar et al. | |
| 2006/0253683 A1 | 11/2006 | Zohar et al. | |
| 2006/0267984 A1 | 11/2006 | Zohar et al. | |
| 2006/0294301 A1 | 12/2006 | Zohar et al. | |
| 2007/0016726 A1 | 1/2007 | Zohar et al. | |
| 2007/0033370 A1 | 2/2007 | Zohar et al. | |
| 2007/0050667 A1 | 3/2007 | Zohar et al. | |
| 2007/0073987 A1 | 3/2007 | Zohar et al. | |
| 2007/0073994 A1 | 3/2007 | Zohar et al. | |
| 2007/0180307 A1 | 8/2007 | Zohar et al. | |
| 2007/0180308 A1 | 8/2007 | Zohar et al. | |
| 2007/0180309 A1 | 8/2007 | Zohar et al. | |
| 2007/0226230 A1 | 9/2007 | Zohar et al. | |
| 2007/0245340 A1 | 10/2007 | Cohen et al. | |
| 2007/0276983 A1 | 11/2007 | Zohar et al. | |
| 2007/0283093 A1 | 12/2007 | Zohar et al. | |
| 2008/0091741 A1 | 4/2008 | Zohar et al. | |
| 2012/0089802 A1 | 4/2012 | Zohar et al. | |
| 2013/0227113 A1* | 8/2013 | Baras | H04L 41/0893 709/224 |
| 2017/0255617 A1* | 9/2017 | Vartakavi | G06F 16/41 |
| 2017/0256060 A1 | 9/2017 | Eldar et al. | |
| 2018/0074714 A9 | 3/2018 | Zohar et al. | |
| 2018/0316707 A1* | 11/2018 | Dodson | H04L 43/16 |
| 2019/0026865 A1 | 1/2019 | Cohen et al. | |
| 2019/0355110 A1 | 11/2019 | Cohen | |
| 2020/0257797 A1 | 8/2020 | Monsonego et al. | |
| 2020/0274894 A1 | 8/2020 | Argoeti et al. | |
| 2020/0320190 A1 | 10/2020 | Maor et al. | |

OTHER PUBLICATIONS

"Get behavioral analytics and anomaly detection", retrieved from <<https://docs.microsoft.com/en-us/cloud-app-security/anomaly-detection-policy>>, Aug. 20, 2020, 12 pages.

* cited by examiner

RESOURCE POPULARITY ASSESSMENT AND UTILIZATION

BACKGROUND

Noon Clouds, local networks, Internet of Things networks, wearable computing devices, augmented reality and virtual reality systems, video gaming systems, smartphones, laptops, tablets, networked appliances, industrial systems, medical devices, security scanners and monitors, and many other devices and systems are configured to provide a wide variety of computing, storage, network, and other digital resources to various users. Such resources are often available on demand, subject to appropriate security, privacy, commercial, and other constraints.

To monitor resource usage, many devices and systems are configured to provide logs, real-time telemetry, or other records of specified events, referred to collectively here as "logs". Events recorded in a log may include, e.g., failed or successful access attempts, information about accesses such as their source and destination IP addresses, timestamps, and a wide variety of other data.

However, even when attention is focused on a single device, the number of potentially logged events is often enormous. Each communication to or from a given tracked device could generate a logged event. Each change in the tracked device's internal state, and each action manifested externally by the device, could also generate a logged event.

In practice, in most situations not every communication and state change and action are logged. This helps address technical questions such as how much storage is needed to hold logs. But questions remain, such as which events to log, and how to process the logged events in order to improve a device or system's usability, security, and other technical characteristics.

SUMMARY

Some embodiments enhance system security by aiding identification of anomalous behaviors. Some enhance efficiency or usability or effectiveness by aiding prioritization of resources according to their utilization, so that more highly used resources can be allocated additional bandwidth, memory, or processing power, for example, and resources with lower utilization can be redesigned or removed from service. In these and other situations, embodiments may aid such enhancements of desired technical characteristics through resource popularity assessments that are obtained via tools and techniques described herein.

Some embodiments use or provide a computing hardware and software combination which includes a digital memory, and a processor which is in operable communication with the memory. The processor is configured, e.g., by tailored software, to perform steps for resource usage characterization and management. Such an embodiment obtains digital resource usage data which associates resources of a monitored computing system with respective usage values, and gets a selection of a particular resource. The particular resource has an associated particular usage value. The embodiment forms a conforming subset and a nonconforming subset, based at least in part on the resource usage values and on a relationship condition which depends on the particular usage value. The conforming subset includes one or more resources whose resource usage values satisfy the relationship condition, and the nonconforming subset includes one or more resources whose resource usage values do not necessarily satisfy the relationship condition.

The embodiment assigns the particular resource a popularity assessment which depends at least in part on a ratio between a first accumulation that is based on the one or more resource usage values of the conforming subset and a second accumulation that is based on the resource usage values of the conforming subset and the nonconforming subset. The assigned popularity assessment may indicate popularity, or it may indicate rareness, e.g., as a complement or inverse of popularity. The embodiment then utilizes the assigned popularity assessment to enhance usability, security, functionality, effectiveness, or efficiency of the monitored computing system.

Some embodiments use or provide steps for a method which characterizes relative resource usage and utilizes results to support or enhance technical operations. The steps may include: obtaining digital resource usage data which associates resources of a monitored computing system with respective usage values; getting a selection of a particular resource, the particular resource having an associated particular usage value; forming a conforming subset and a nonconforming subset based at least in part on the resource usage values and on a relationship condition which depends on the particular usage value, the conforming subset including one or more resources whose resource usage values satisfy the relationship condition and the nonconforming subset including one or more resources whose resource usage values do not satisfy the relationship condition; assigning the particular resource a popularity assessment which depends at least in part on a ratio between a first accumulation that is based on the one or more resource usage values of the conforming subset and a second accumulation that is based on the resource usage values of the conforming subset and the nonconforming subset; and utilizing the assigned popularity assessment. In this example, the popularity assessment is utilized to facilitate at least one of the following: anomaly detection, cybersecurity risk management, resource access prioritization, volatile memory allocation, non-volatile memory allocation, processor allocation, bandwidth allocation, or resource management.

Some embodiments use or provide a computer-readable storage medium configured with data and instructions, or use other computing items, which upon execution by a processor cause a computing system to perform a method which characterizes relative resource usage in a computing environment. This embodiment obtains digital resource usage data which associates resources of the computing environment with respective usage values, and gets a selection of a particular resource which is denoted here as R. The resource R has a usage value which is denoted here as RUsage. This embodiment divides the resources of the computing environment into subsets based at least in part on the resource usage values and on a relationship condition which depends on the usage value RU, thereby forming a conforming subset and a nonconforming subset. The conforming subset includes one or more resources whose resource usage values satisfy the relationship condition, and the nonconforming subset includes one or more resources whose resource usage values do not satisfy the relationship condition.

This embodiment assigns the resource R a popularity which is denoted here as RPopularity. The value of RPopularity depends at least in part on a ratio between an accumulation denoted here as RConformingUsage that is based on the one or more resource usage values of the conforming subset, and an accumulation denoted here as RAllUsage that is based on the resource usage values of the conforming subset and the nonconforming subset. This embodiment also utilizes the resource R popularity RPopularity, e.g., to enhance at least one of usability, security, functionality, effectiveness, or efficiency of the computing environment.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
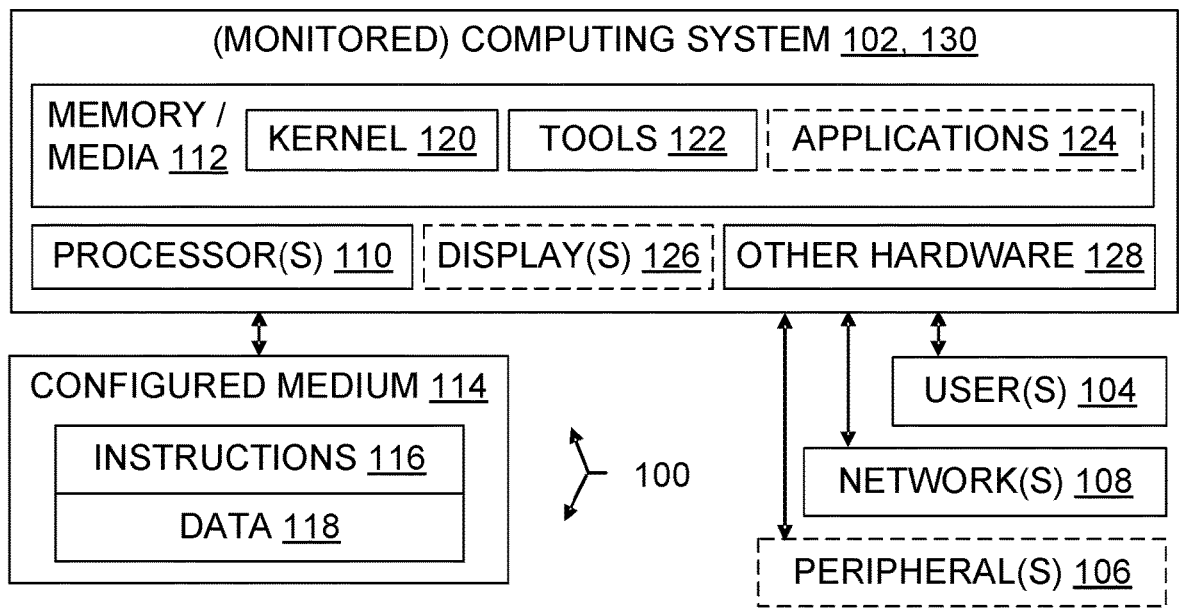
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges faced by Microsoft innovators who were working to improve the usability, efficiency, and effectiveness of Microsoft cloud security offerings, including versions of Microsoft cloud app security, e.g., Conditional Access App Control™ security software within Azure® Active Directory® environments, and Azure® Sentinel SIEM software (marks of Microsoft Corporation). Teachings herein also apply to other cloud and non-cloud software environments, applications, and tools, and teachings may also be applied to advance goals beyond the realm of cybersecurity, e.g., for resource allocation.

To identify anomalous behavior that may indicate a serious security threat, a security system may attempt to detect unusual usage of a resource. Intuitively, usage of a resource that is usually not used very much may be worth investigating. Accordingly, some security approaches quantify resource usage in order to identify unpopular resources; if an unpopular resource is used despite its lack of popularity, that usage may be part of an attack or be an indication that security was breached.

Resource usage may be quantified in various ways. For example, the number of distinct users of a resource may be a basis for calculating a resource popularity. A raw count of the number of distinct users carries some information, but relative measures of usage may be more informative.

However, relative usage may be defined in different ways. One approach simply divides the number of counted distinct users of a given resource into the number of possible distinct users of the resource. For instance, if a cloud tenant (e.g., a business or other organization) has one hundred authorized users, and a VPN portal that is available to any or all of those users has ten distinct users during a particular week, then the popularity of the VPN portal may be calculated as (10 actual users of the VPN resource)/(100 possible users)=0.1.

Another approach divides the number of counted distinct users of a given resource into the number of distinct users of the most-used resource. Continuing the scenario above, suppose the resource that was used by the largest number of distinct users during the week is a videoconference tool, which fifty of the cloud tenant users made use of during the week. Then the popularity of the VPN portal would be calculated as (10 VPN users)/(50 videoconference users)= 0.2.

The resource popularity formulas underlying these two VPN portal examples are not limited to VPN portals, although they do have other limitations noted herein, such as ignoring many available usage values. For convenience, these formulas are referred to herein as PopularityV1( ) formulas. An embodiment according to the teachings provided herein may employ PopularityV1( ) computation provided that is not the only popularity computation the embodiment employs; it is expected that a PopularityV2( ) computation taught herein would also be employed. Unlike the PopularityV1( ) approaches, a PopularityV2( ) approach relies on a ratio of accumulations, with the denominator based on multiple usage values and the numerator based on a relationship condition.

For reasons that will be explained and illustrated below, better approaches are now available to meet the technical challenges of defining resource popularity, including an emergent subsidiary challenge of efficiently calculating resource popularity despite the involvement of additional data. In general, these approaches involve a ratio of two accumulations of resource usage values. The ratio's numerator includes usage values for a subset of all resources of interest, e.g., the sum of the usage values for resources whose usage is less than or equal to the usage of a resource whose popularity is being calculated. The ratio's denominator includes usage values for all the resources of interest.

Detailed examples of resource popularity calculation using a ratio of accumulations approach are provided below. But even without these examples, it will be apparent to one of skill that the resource usage values involved in the calculation have expanded significantly. Popularity calculation is redefined by teachings herein to improve on the PopularityV1( ) approach by including more than merely a particular resource (e.g., the VPN) whose popularity is being calculated and at most one other resource (e.g., the video-conference tool).

Approaches taught herein can avoid a dependency on one computed value, e.g., dependency on the video conference user count or another maximum usage counter for normalization. Teachings herein allow a better and more sensitive computation, taking into account an entire distribution of resource usage patterns. Some teachings herein also make it easier to assign an anomaly score value by evaluating resource usage pattern likelihood. Other advantages will also be clear to one of skill in the art, as will the technical challenges met, as they are addressed at various points within the present disclosure.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud or enterprise network. In particular, functionality for resource popularity assessment could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
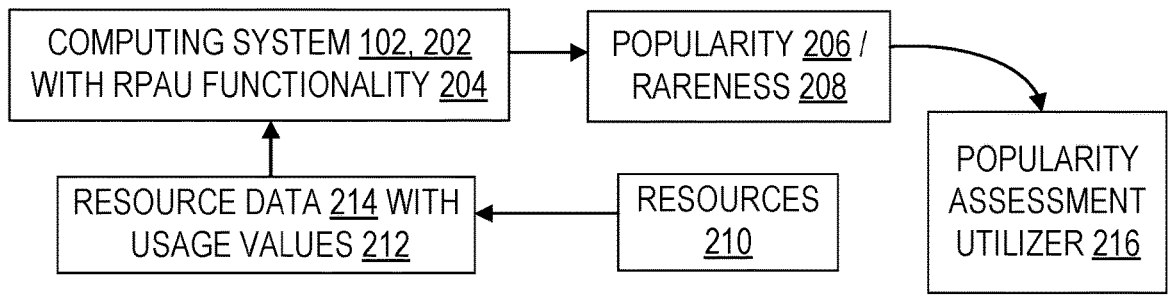
FIG. 2 is a block diagram illustrating a computing system equipped with resource popularity assessment and utilization (RPAU) functionality, and some aspects of a surrounding environment.
Figure 3:
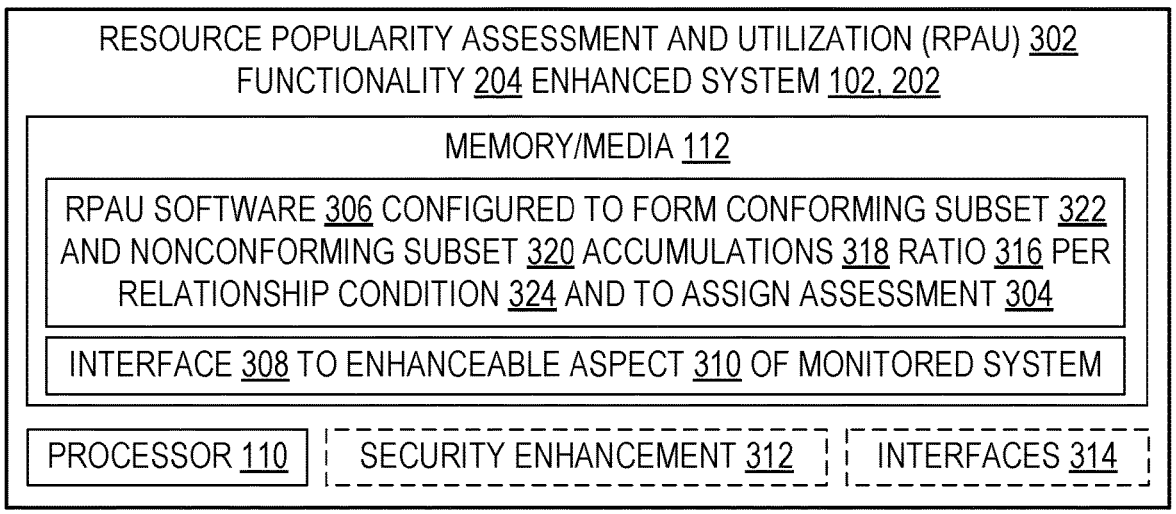
FIG. 3 is a block diagram illustrating some aspects of an enhanced computing system configured with RPAU functionality.

FIGS. 2 and 3 illustrate an environment having an enhanced system 202, 102 that includes functionality 204 for resource popularity assessment and for the utilization of such assessments 304. Resource popularity assessment and utilization as a topic 302 is also referred to as "RPAU" herein. Unless otherwise stated, an instance of RPAU functionality 204 includes functionality for producing resource popularity assessments 304 as taught herein, or functionality for the utilization of such assessments 304, or both. In some embodiments, the RPAU functionality 204 is divided between different machines 102, while in others the functionality 204 resides on a single machine 102. Machines 102 may communicate through interfaces 314.

Popularity values 206 and rareness values 208 are each examples of popularity assessments 304. In general, a high popularity value 206 associated with a resource 210 indicates that the resource is often used, widely used, or regularly used, whereas a high rareness value 208 associated with the resource 210 indicates that the resource is not often used, not widely used, or not regularly used. In a given embodiment, rareness may be calculated as a complement of popularity (one minus the popularity), or as an inverse of popularity, for example. Popularity values 206 and rareness values 208 are calculated by RPAU software 306 from resource usage values 212 that are provided in resource data 214.

The popularity assessments 304 (popularity values 206, rareness values 208, or both) are fed through an interface 308 to one or more popularity assessment utilizers 216, e.g., security tools or resource management tools. Then the popularity assessments 304 are used to enhance some aspect 310 of a system, e.g., the system's security, efficiency, or usability.

Some popularity assessments 304 described herein originated in an effort to improve cybersecurity through better anomaly detection, but security enhancements 312 are not the only uses of popularity assessments 304. For instance, efficiency 410 may be enhanced by redesigning or removing resources that are not popular. If an unpopular resource is considered worth keeping in some form then a redesign may improve its popularity, and otherwise the resource's lack of popularity may mean there is insufficient demand to continue providing (and supporting) it.

Some embodiments herein build a popularity assessment 304 from a ratio 316 of two accumulations 318 of two respective subsets 322, 320 of resource usage values 212 and a relationship condition 324. One of the subsets is referred to as a "conforming subset" 322 and the other is a "non-conforming subset" 320, but other designations could be used, e.g., "numerator subset" 322 and "denominator subset" 320, or "narrower focus subset" 322 and "wider focus subset" 320, or still other designations. The subset 322 is limited to resource usage values 212 that conform to the relationship condition 324, whereas the subset 320 is not thus limited. In each subset, the resource usage values 212 are accumulated, e.g., by summation.

Detailed examples are given herein of popularity assessment based on a ratio 316 of accumulations 318. But even without such examples, it will be apparent to one of skill that more resource usage values are involved in forming a PopularityV2( ) ratio of accumulations than were used in calculating under the PopularityV10 approach a resource popularity for the VPN portal in the examples above. Involving additional resource usage values 212 tends to increase the computational processing and storage requirements for popularity computations. But it will also become apparent that the ratio 316 of accumulations 318 approach taught herein reduces or avoids shortcomings of the less computationally intensive approaches used in the PopularityV10 examples, such as their tendency to undervalue popularity when many resources are each used infrequently.

Figure 4:
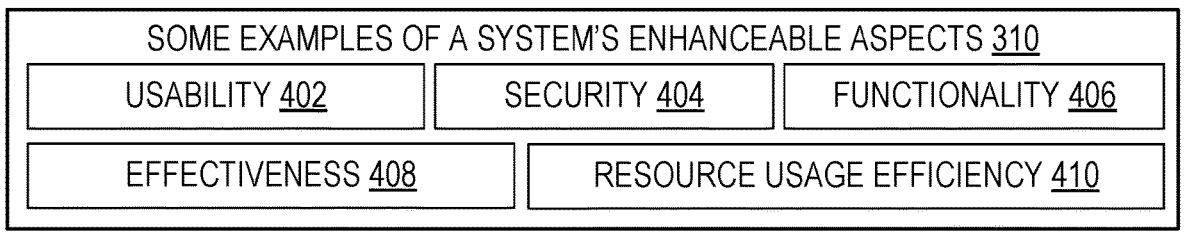
FIG. 4 is a block diagram illustrating some examples of technical characteristics that may be enhanced by the operation of RPAU functionality.

FIG. 4 illustrates several examples of enhanceable aspects 310 of systems 102. These items are discussed at various points herein, and additional details regarding them are provided in the discussion of a List of Reference Numerals later in this disclosure document.

Figure 5:
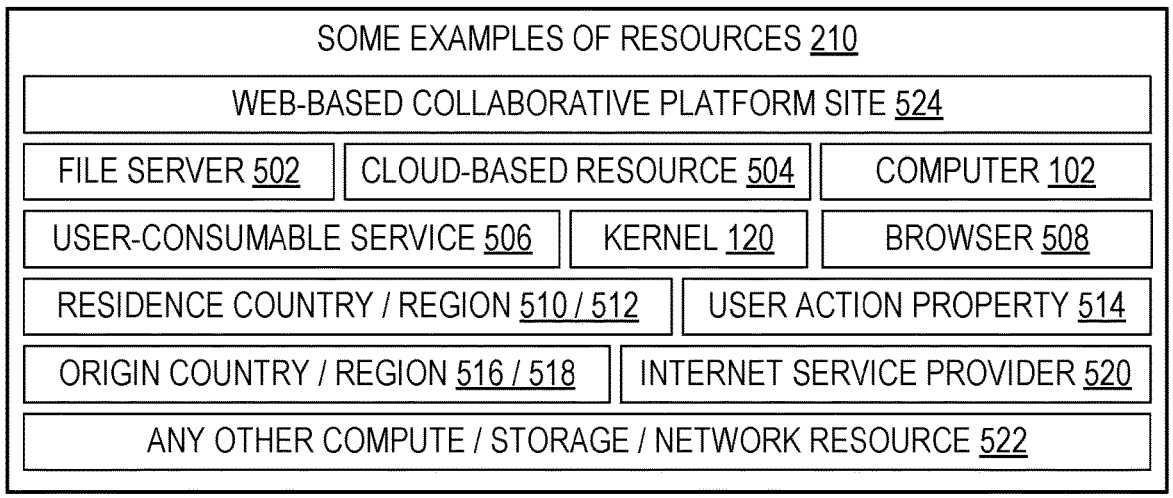
FIG. 5 is a block diagram illustrating some examples of digital resources.

FIG. 5 illustrates some examples of resources 210. These items are discussed at various points herein, and additional details regarding them are provided in the discussion of a List of Reference Numerals later in this disclosure document.

Figure 6:
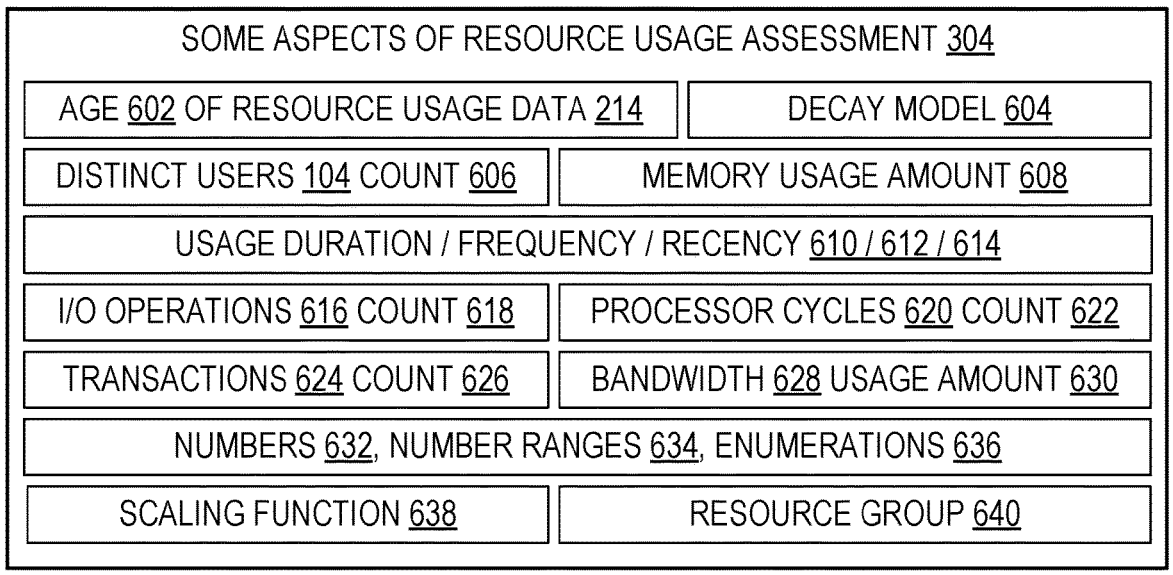
FIG. 6 is a block diagram illustrating some aspects of digital resource popularity assessment operations and results.

FIG. 6 illustrates some aspects of resource popularity assessment 304. As used herein, "assessment" and the reference numeral 304 may pertain to a noun (e.g., an assigned assessment value 304 may be computed as a ratio of accumulations), or to a verb (e.g., an assessment 304 may be performed at regular or irregular intervals). The illustrated aspects of assessment 304 are discussed at various points herein, and additional details regarding them are provided in the discussion of a List of Reference Numerals later in this disclosure document.

Figure 7:
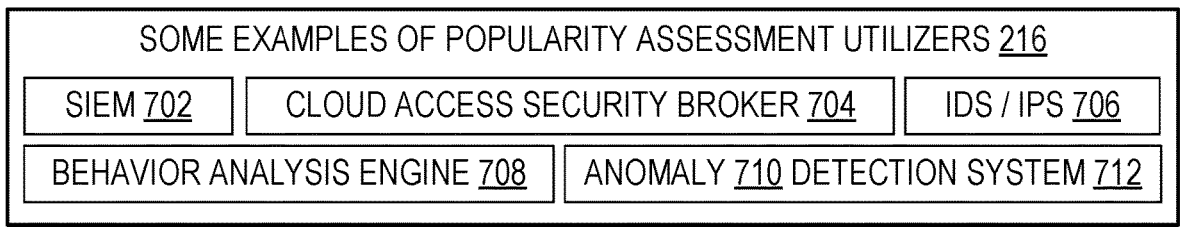
FIG. 7 is a block diagram illustrating some examples of resource popularity assessment utilizers, e.g., software that may beneficially utilize a resource popularity assessment.

FIG. 7 illustrates some examples of popularity assessment utilizers 216. These items are discussed at various points herein, and additional details regarding them are provided in the discussion of a List of Reference Numerals later in this disclosure document.

Figure 8:
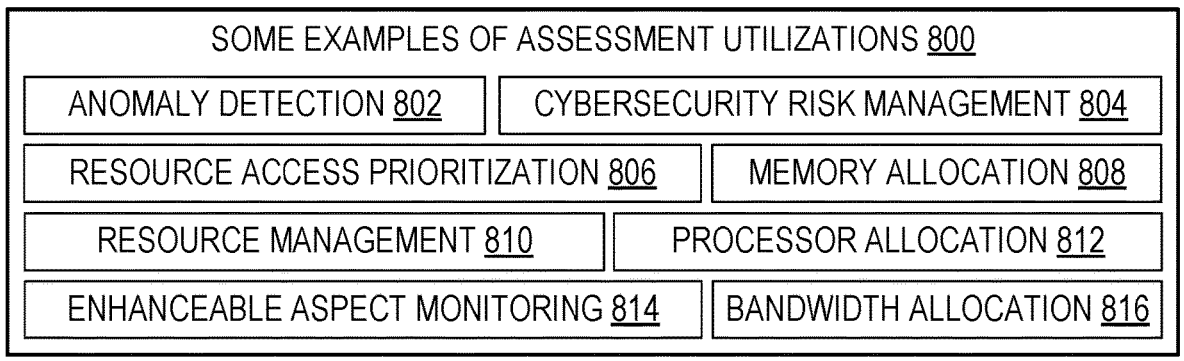
FIG. 8 is a block diagram illustrating some examples of resource popularity assessment utilizations, e.g., technical activities in which resource popularity assessments may be beneficially utilized.

FIG. 8 illustrates some examples of popularity assessment utilizations 800. These items are discussed at various points herein, and additional details regarding them are provided in the discussion of a List of Reference Numerals later in this disclosure document.

Some embodiments use or provide a functionality-enhanced system, such as system 202 or another system 102 that is enhanced as taught herein. In some embodiments, a system 202 configured for characterizing relative resource usage includes a digital memory 112. A processor 110 is in operable communication with the memory 112. The processor is configured, e.g., with software 306, to perform resource usage characterization and management steps which include (a) obtaining 902 digital resource usage data 214 which associates resources 210 of a monitored computing system 130 with respective usage values 212, (b) getting 904 a selection 906 of a particular resource, the particular resource having an associated particular usage value, (c) forming 908 a conforming subset 322 and a nonconforming subset 320 based at least in part on the resource usage values and on a relationship condition 324 which depends on the particular usage value, the conforming subset including one or more resources whose resource usage values satisfy the relationship condition and the nonconforming subset including one or more resources whose resource usage values do not satisfy the relationship condition, (d) assigning 910 the particular resource a popularity 304 which depends at least in part on a ratio 316 between a first accumulation 318 that is based on the one or more resource usage values of the conforming subset and a second accumulation 318 that is based on the resource usage values of the conforming subset and the nonconforming subset, and (e) utilizing 912 the assigned popularity to enhance 1022 usability, security, functionality, effectiveness, efficiency, or another technical aspect 310 of the monitored computing system.

In some embodiments, the resources 210 include at least one of the following: a web-based collaborative platform site 524, a file server 502, a computer 102, a cloud-based resource 504, or a user-consumable service.

In some embodiments, the resources 210 include at least one of the following: a resource access country of origin 516, a resource access region of origin 518, a resource country of residence 510, a resource region of residence 512, an operating system or other kernel 120, an internet service provider 520, a category of web browser 508, a particular web browser 508, a unique property 514 which describes a user action, e.g., a distinct user identification.

Some embodiments use a decay model 604 to allow more efficient computation of popularity. In some embodiments, at least some of the resource usage data 214 has an associated age 602, and the embodiment includes a decay model 604 which is configured to determine inclusion or exclusion of resource usage data based at least in part on resource usage data age.

Some embodiments communicate with, or include, at least one of the following popularity assessment utilizers 216: a security information and event management tool 702 which utilizes the assigned popularity (e.g., an Azure Sentinel® SIEM; mark of Microsoft Corporation), a cloud access security broker 704 which utilizes the assigned popularity (Microsoft Cloud App Security™ software), a user and entity behavior analysis engine 708 which utilizes the assigned popularity, an intrusion detection system 706 or an intrusion prevention system 706 which utilizes the assigned popularity, or an anomaly detection system 712 which utilizes the assigned popularity.

Other system embodiments are also described herein, either directly or derivable as system versions of described processes or configured media, duly informed by the extensive discussion herein of computing hardware. Examples are provided in this disclosure to help illustrate aspects of the technology, but the examples given within this document do not describe all of the possible embodiments. An embodiment may depart from the examples. For instance, items shown in different Figures may be included together in an embodiment, items shown in a Figure may be omitted, functionality shown in different items may be combined into fewer items or into a single item, items may be renamed, or items may be connected differently to one another. A given embodiment may assess popularity of additional or different resources, and may include or invoke additional or different technical features, operational sequences, data structures, or utilization functionalities for instance, and may otherwise depart from the examples provided herein.

Processes (a.k.a. Methods)

Figure 9:
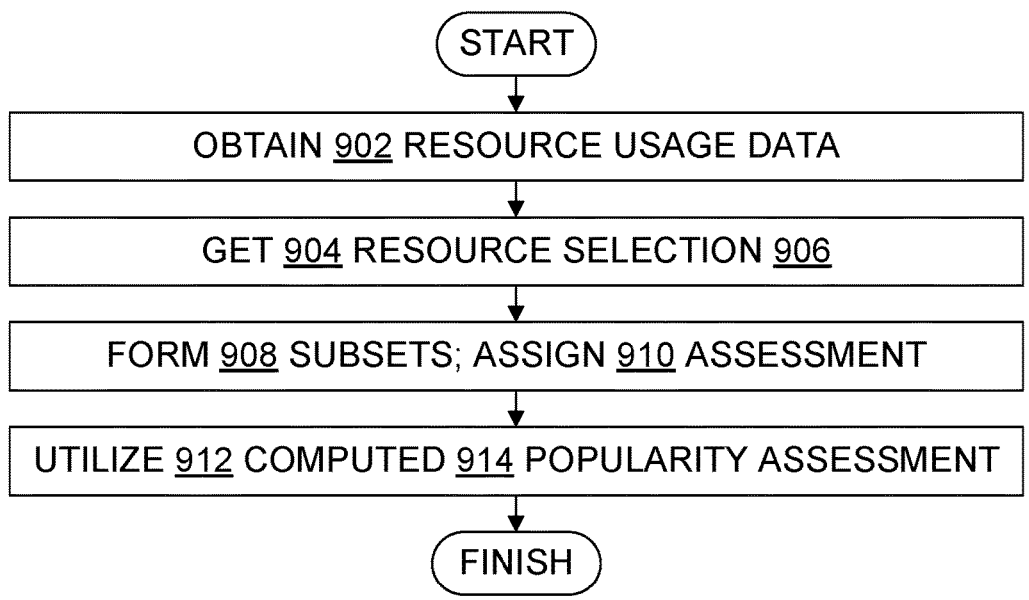
FIG. 9 is a flowchart illustrating steps in some resource popularity assessment and utilization methods.
Figure 10:
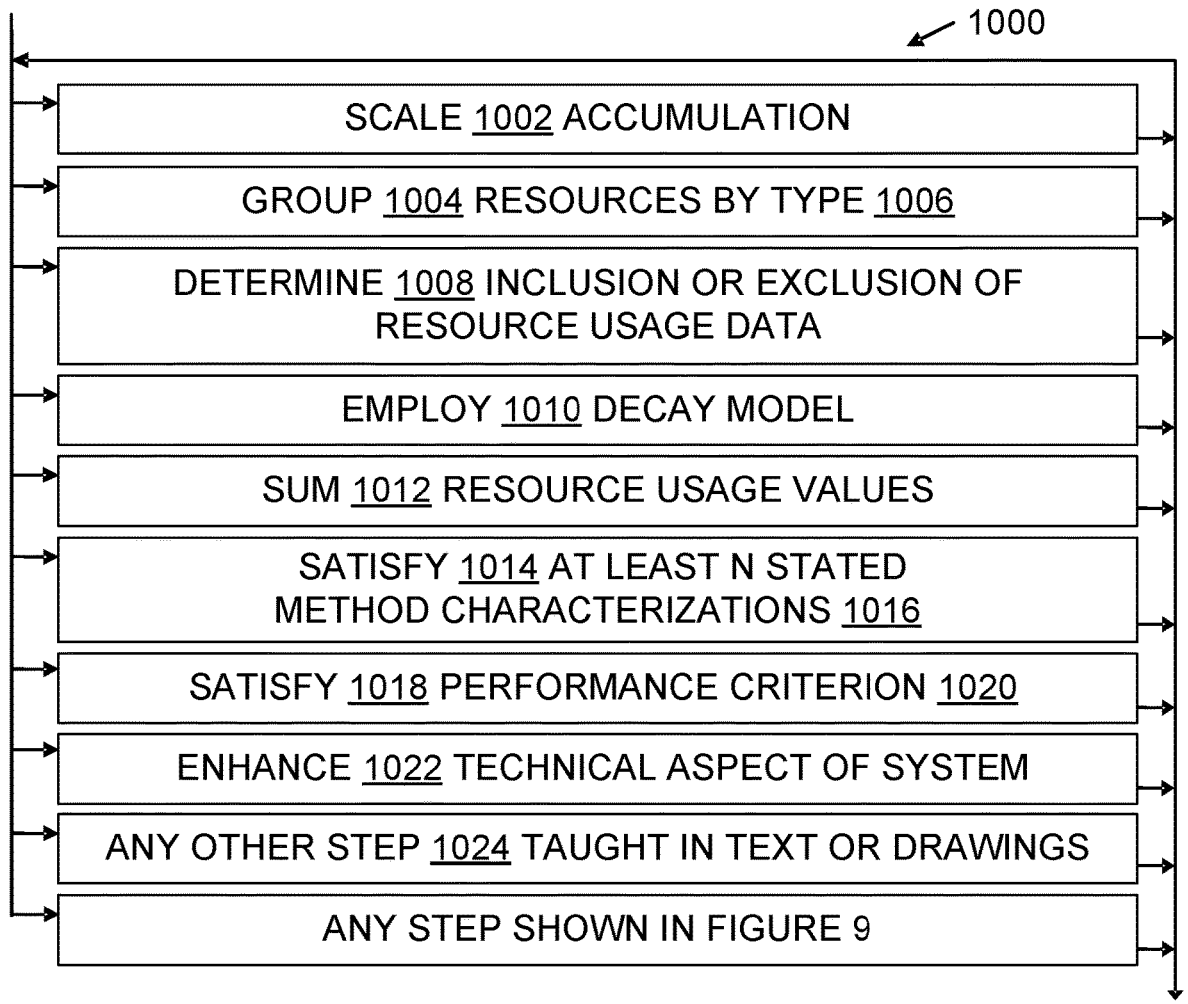
FIG. 10 is a flowchart further illustrating steps in some resource popularity assessment and utilization methods.

FIG. 9 illustrates a family of methods 900 that may be performed or assisted by a given enhanced system, such as any system 202 example herein or another functionality 204 enhanced system as taught herein. FIG. 10 further illustrates methods involving resource popularity assessment(s). FIG. 10 incorporates all steps shown in FIG. 9. Methods 900 or 1000 may also be referred to as resource popularity assessment "processes" in the legal sense of the word "process".

Technical processes shown in the Figures or otherwise disclosed will be performed automatically, e.g., by an enhanced system 202 or software component thereof, unless otherwise indicated. Processes may also be performed in part automatically and in part manually to the extent activity by a human person is implicated. For example, in some embodiments a human may select 906 a particular resource and command an enhanced system to compute a popularity assessment 304 for that particular resource. But no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 9 and 10. Steps may be performed serially, in a partially overlapping manner, or fully in parallel. In particular, the order in which flowchart 900 or flowchart 1000 operation items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method which characterizes relative resource usage and utilizes results to support or enhance technical operations, including automatically: obtaining 902 digital resource usage data which associates resources of a monitored computing system with respective usage values; getting 904 a selection of a particular resource, the particular resource having an associated particular usage value; forming 908 a conforming subset and a nonconforming subset based at least in part on the resource usage values and on a relationship condition which depends on the particular usage value, the conforming subset including one or more resources whose resource usage values satisfy the relationship condition and the nonconforming subset including one or more resources whose resource usage values do not satisfy the relationship condition; assigning 910 the particular resource a popularity which depends at least in part on a ratio between a first accumulation that is based on the one or more resource usage values of the conforming subset and a second accumulation that is based on the resource usage values of the conforming subset and the nonconforming subset; and utilizing 912 the assigned popularity.

Some embodiments utilize 912 an assigned popularity 304 to facilitate at least one of the following: anomaly detection 802, cybersecurity risk management 804 (e.g., anomaly detection, intrusion detection, intrusion protection, risk mitigation, incident recovery, etc.), resource ranking 806 (e.g., most popular to least popular), resource access prioritization 806 (e.g., allocate more processor or storage or bandwidth to accesses that use the top N % of the most popular resources), volatile memory allocation 808, non-volatile memory allocation 808, processor allocation 812, bandwidth allocation 816, or resource management 810 (e.g., to perform or optimize usage tracking, prioritization, allocation, lifecycle management, or security).

In some embodiments, the method obtains 902 digital resource usage data which associates resources 210 of a monitored computing system 130 with respective usage values 212 that measure at least one of the following: distinct users 104 of a given resource; users 104 of a given resource, regardless of whether they are distinct users or not; duration 610 of use of a given resource; frequency 612 of use of a given resource; recency 614 of use of a given resource; amount 608 of volatile memory used; amount 608 of non-volatile memory used; I/O operations 616; processor cycles 620; bandwidth 628; or number of transactions 624.

In some embodiments, the method is characterized in at least one of the following ways: numbers 632 represent usage values 212; number ranges 634 represent usage values 212; enumerations 636 represent usage values (e.g., low, medium, high); a number 632 represents the popularity 304; a number range 534 represents the popularity 304; or an enumeration value 636 represents the popularity 304.

In some embodiments, the relationship condition 324 is satisfied by a given usage value when the given usage value is greater than or equal to the particular usage value.

In some embodiments, assigning the popularity includes scaling 1002 the first accumulation and scaling 1002 the second accumulation, the scaling performed according to a scaling function 638, e.g., a logarithmic function.

Some embodiments group 1004 resources according to one or more criteria (type, size, cost, previous popularity, etc.) and then scale 1002 different groups differently. In some embodiments, the method includes grouping 1004 resources into resource groups 640, and assigning 910 different resource groups respective popularity values 304. Some embodiments include grouping 1004 resources into resource groups 640 having respective resource usage value accumulations 318, and scaling 1002 resource usage value accumulations of different resource groups using respective scaling functions 638.

In some embodiments, forming 908 the first accumulation includes summing 1012 the one or more resource usage values of the conforming subset, and forming 908 the second accumulation includes summing 1012 the resource usage values of the conforming subset and the nonconforming subset.

Some embodiments use resource usage values from a particular time period. These embodiments include, but are not limited to, those that use a sliding window. In some embodiments, the method obtains 902 digital resource usage data in which the usage values are associated with one or more respective time periods 602 or points in time 602, and the usage values which are employed while forming 908 the conforming subset and the nonconforming subset are from a particular specified time period.

In some embodiments, at least some of the resource usage data has an associated age 602, and the method includes employing 1010 at least one of the following decay models 604 to determine inclusion or exclusion of resource usage data based at least in part on resource usage data age: a linear interpolation decay model 604, or an exponential interpolation decay model 604.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as RPAU software 306, accumulation values 318, value subsets 320, 322, ratios 316, relationship conditions 324 as manifest in code 306, interfaces 308, popularity assessments 304, resource groups 640, assessment utilizers 216, and scaling functions 638, in the form of data 118 and instructions 116, read from a removable storage medium 114 and/or another source such as a network connection, to form a configured storage medium. The configured storage medium 112 is capable of causing a computer system 102 to perform technical process steps for resource popularity assessment activities, as disclosed herein. The Figures thus help illustrate configured storage media embodiments and process (a.k.a. method) embodiments, as well as system and process embodiments. In particular, any of the process steps illustrated in FIG. 9 or 10 or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a method which characterizes relative resource usage in a computing environment. This method includes: obtaining 902 digital resource usage data which associates resources of the computing environment with respective usage values; getting 904 a selection of a particular resource which is denoted here as R, the resource R having a usage value which is denoted here as RUsage; dividing 908 the resources of the computing environment into subsets based at least in part on the resource usage values and on a relationship condition which depends on the usage value RU, thereby forming a conforming subset and a nonconforming subset, the conforming subset including one or more resources whose resource usage values satisfy the relationship condition and the nonconforming subset including one or more resources whose resource usage values do not satisfy the relationship condition; assigning 910 the resource R a popularity which is denoted here as RPopularity, where RPopularity depends at least in part on a ratio between an accumulation denoted here as RConformingUsage based on the one or more resource usage values of the conforming subset and an accumulation denoted here as RAllUsage based on the resource usage values of the conforming subset and the nonconforming subset; and utilizing 912 the resource R popularity RPopularity to enhance at least one of usability, security, functionality, effectiveness, or efficiency of the computing environment.

Resource values and other quantities may vary between embodiments and even between implementations that employ a particular embodiment, to the extent the quantities depend heavily on customer data. A customer with a small amount of resources might have tens of different resources within a specific category (for example, web sites or APIs), while large organizations often have thousands or more. In addition, an embodiment may be multi-tenant, such that quantifiable performance goals and other quantities are not related to one specific customer. However, some performance criteria are offered below.

In some embodiments, at least one of the following performance criteria is satisfied: the digital resource usage data 214 associates at least 90% of the resources 210 of a given resource type in the computing environment with respective usage values 212, the method assigns respective popularities 304 to at least 90% of the resources 210 of a given resource type in the computing environment, the method assigns respective popularities 304 to at least 90% of the resources of a given resource type in the computing environment at least once every hour, or the calculated digital resource usage data (e.g., per a decay model 604) is within plus or minus two percent of a corresponding exact usage value 212.

Some embodiments compute resource popularity in or near a real-time rate. This may require significant computation, well beyond mere mental efforts. For example, one embodiment processes about 20,000 events per second. For each event, the embodiment computationally extracts the relevant resource types and calculates their popularity values. The number of resources 210 may vary depending on the resource type and organization size. For example, in one cloud environment 130 in the Resource Type=Computer case, there are about 100K resources in the largest tenant.

In some embodiments, the method is further characterized by at least two of the following method characterizations: the method obtains digital resource usage data 214 which associates resources of a monitored computing system with respective usage values that measure distinct users of a given resource; the relationship condition 324 is satisfied by a given usage value when the given usage value is greater than or equal to the usage value RU; assigning 910 the popularity RPopularity includes scaling the first accumulation and scaling the second accumulation, the scaling performed according to a log scaling function; forming 908 the first accumulation RConformingUsage includes summing the one or more resource usage values of the conforming subset, and forming the second accumulation RAllUsage includes summing the resource usage values of the conforming subset and the nonconforming subset; the method obtains 902 digital resource usage data in which the usage values are associated with one or more respective time periods or points in time, and wherein the usage values which are employed while forming the conforming subset and the nonconforming subset are from a particular specified time period; or at least some of the resource usage data has an associated age 602, and the method includes employing 1010 a linear interpolation decay model to determine inclusion or exclusion of resource usage data based at least in part on resource usage data age. In some embodiments, the method is characterized by at least three of the method characterizations. In some, the method is characterized by at least four of the method characterizations. Other characterization levels are also contemplated.

Technical Character

The technical character of embodiments described herein will be apparent to one of ordinary skill in the art, and will also be apparent in several ways to a wide range of attentive readers. Some embodiments address technical activities such as obtaining 902 digital resource usage data 214, computationally forming 908 subsets using accumulations 318 and a relationship condition 324 as taught herein, computing 914 resource popularity assessments 304 with or without variations such as scaling 1002 and decay models 604, and automatically utilizing 912 computed assessments within a SIEM 702 or a behavior analysis engine 708 or another software and hardware tool 216, each of which is an activity deeply rooted in computing technology. Some of the technical mechanisms discussed include, e.g., RPAU software 306, popularity assessment utilizers 216, decay model implementations 604, scaling functions 638, and resource groups 640. Some of the technical effects discussed include, e.g., expanded employment of resource usage values 212 for popularity assessment as compared to the PopularityV10 example approaches, efficient computation of popularity assessments 304 despite such expansion, anomaly detection, and enhancements to technical aspects such as security and resource allocation in a computing environment 130 even when thousands of resources 210 are involved. Thus, purely mental processes are clearly excluded. Other advantages based on the technical characteristics of the teachings will also be apparent to one of skill from the description provided.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some Example Popularity Assessment Scenarios

Assume there are eighteen resources (labeled here as "a" through "r" for convenience) that each have usage 1, one resource labeled here as "s" that has usage 500, and one resource labeled here as "t" that has usage 1000. Resource labels may also be used herein without quotes, e.g., resource a. Label quotes or lack thereof is a stylistic preference, not a substantive difference.

Also, assume that a popularity assessment functionality is implemented according to the following formula:

PopularityV2($x$)=(log(sum(usage values<=usage ($x$))))/(log(sum(all usage values)))

Then one has the following.

For the resource k, PopularityV2(k)=log(18×1)/log(18× 1+1×500+1×1000), where x denotes multiplication. The numerator of the PopularityV2(k) ratio includes "18×1" because there are 18 resources (labeled a through r) that each have usage 1 or less; the cutoff for including data in the numerator is usage 1 because the usage of k is 1 and this example is calculating the popularity of k.

The denominator includes all resource usage data. So the denominator has "18×1" again for the 18 resources labeled a through r that each have usage 1 or less, plus "1×500" for the 1 resource labeled s that has usage 500, plus "1×1000" for the 1 resource labeled t that has usage 1000. Nothing else goes in the denominator, because there are no other resources in this example.

Doing the arithmetic yields log(18)/log(1518)= 0.394581977033659921314312669606661 on one calculator, which gets rounded to 0.4.

As another example, for the resource s PopularityV2(s)= log(18×1+1×500)/log(18×1+1×500+1×1000). The ratio numerator in this example includes "18×1" because there are 18 resources (labeled a through r) that each have usage 1, which is 500 or less. The numerator also includes "1×500" for resource s. The cutoff for the numerator is usage 500 because the usage of s is 500 and this example is calculating the popularity of s.

The denominator is the same as in the resource k example above. That is, the denominator includes all resource usage data for the resources "a" through "t" that constitute the resources of interest. Doing the arithmetic yields log(518)/log(1518)=0.853221590186451362938474701561955 on one calculator, which gets rounded to 0.9.

As a third example with these resources "a" through "t" and their stated usage values, PopularityV2(t)=log(18×1+1×500+1×1000)/log(18×1+1×500+1×1000). The numerator includes "18×1" because there are 18 resources (labeled a through r) that each have usage 1, which is 500 or less. The numerator also includes "1×500" for resource s. The numerator also includes "1×1000" for resource t. The cutoff for the numerator is usage 1000 because the usage of t is 1000 and this example is calculating the popularity of t. Because t's popularity is also the max popularity (1000), the numerator includes all resource usage data.

The denominator is the same as in the resource k and resource s examples above. Doing the arithmetic yields log(1518)/log(1518)=1.

Some Assessment Variation Observations

The following observations about variations may also be helpful.

A ratio 316 of two accumulations may be a ratio of two log( ) expressions as in the PopularityV2( ) formula implementation, but in some embodiments a different scaling function 638 than log( ) is used, and in some no scaling function is used to scale the ratio.

In some embodiments, the relationship condition 324 is implemented as the <=cutoff stated in the PopularityV2( ) formula. However, "<=", "<", ">", ">=", and "within a specified tolerance" are each used as the relationship condition in various embodiments.

In some embodiments, an accumulation is implements by a summation as illustrated in the PopularityV2( ) formula. However, some examples of an accumulation 318 include "sum or Σ", "product or Π", and "aggregate functions" in various embodiments.

Also, the ratio itself need not be the final popularity-related value; a rareness could be computed, e.g., as 1—ratio, that is, as "compute the one minus popularity" or "compute the complement". In terms of a formula, one may employ ComplementPopularity(x)=1-PopularityV2(x). In this case, the original popularityV2 formula measures how popular a resource is, while the complement popularity is a measure of how rare is it.

Usage may be quantified 212 as a number 606 of distinct users 104, for example. Some other examples of usage measurements include user count (not necessarily distinct users), duration of use, frequency of use, recency of use, amount of volatile or non-volatile memory used, I/O operations, processor cycles, bandwidth, transaction count, etc.

Usage values 212 and popularity values 304 each can be numbers or number ranges or enumerations (e.g., low/medium/high is an enumeration).

The computing system 202 that does the popularity computation 914 may be the same system as the monitored computing system 130 whose resource usages are being tracked, or they may be different systems 102.

The phrase "respective values" does not necessarily mean different values, e.g., two resources R1 and R2 may have respective usage values that happen to be the same (e.g., seven and seven) or respective usage values that happen to be different (e.g., seven and ten).

Some Efficiency Observations

Some embodiments provide or perform efficient computing of resource popularity using an accumulated frequency technique taught herein. Some embodiments model anomalousness of an action done by a user, by relating the action to other actions across the organization. Unlike some other approaches, some teachings provided herein consider both the rarity of an action and the frequency of the action. If a user performs an action not many other users performed in the organization, but there are a lot of rare actions happening across the tenant, then an embodiment according to such teachings will produce a mild anomalousness score (a.k.a. "anomaly score"). On the other hand, when the action is rare and the organization doesn't experience a lot of rare events, such an embodiment model will produce a high anomaly score.

Some earlier popularity-based anomaly models compute resource usage from seen events, and normalize by highest-used resource. Applying teachings provided herein can improve resource popularity assessment 304 by looking at distributions, with the probability of the resource usage being lower or equal to the current seen usage values. This approach avoids the dependency on one computed value (a maximum usage counter used for normalizing), and allows a better and more sensitive computation by taking into account an entire distribution of resource usage patterns. Another advantage of such a probabilistic approach is that it tends to be easier to assign an anomaly score value by evaluating the probability of the resource usage patterns.

In addition, some teachings provided herein also describe an efficient way of computing the distribution, e.g., by omitting parts of the data that are hard to fetch, according to a given decay model. This allows the computation 914 to be efficient, with fewer I/O operations than a naïve approach.

With regard to runtime optimization, in some embodiments a popularity module depends on a previous module to compute distinct usage. Distinct usage computation may be heavy, so some optimizations attempt to minimize it, e.g., by having each event only compute the usage for its resources. In some embodiments, the popularity module gets the correct usage of the current event, with the current resource, and data for other resources is cached from previous events, and scaled according to a uniform distribution model. Thus, when processing an event about resource A in an embodiment that keeps 30 days of usage data, when the last cache update on resource B was 10 days ago, a usage number for B may be reduced by ⅓.

Some embodiments track or calculate probabilities over time regarding users in the scope of an organization (not over location).

Some Observations on Resources and Resource Usage

Some embodiments define a resource 210 as one of the following: (a) an instance of a service consumed by users, such as a collaboration site, file server, or cloud-based resource, or (b) a unique or at least narrowing property which describes a user action, such as country, ISP, or internet browser. In some embodiments, each resource has a resource type 1006. In the above examples the resource types are collaboration site, file server, cloud resource, country, ISP and internet browsers.

Some embodiments define the usage of a resource within an organization to be the amount 606 of distinct users that used the resource in a certain time span, e.g., 30 days. A frequency of a certain usage may be defined as the number of resources which have this usage value.

As noted elsewhere herein, there are several ways to calculate the usage of a resource. Some possibilities can be described with a relatively trivial approach (in terms of runtime). Assume there are three sites 524 in an organization, denoted here as "site 1", "site 2" and "site 3", and a service which measures their usages is desired.

One possible service will perform the following. For each site, the service maintains a mapping from user IDs to the last time the user connected to the site (or null in case the user didn't connect). The mapping can be kept in a database, or by using application memory (via cache\state). The service listens to site events in the organization. Each such event contains a user ID, a site name, and a time. Whenever a new event arrives, the service updates the mapping accordingly.

To calculate the usage of a certain website 524, the service iterates over all users, and counts how many of them connected to the website in the past month. In this example the usage is calculated daily, since its value may vary depending on the time it is calculated, as illustrated in the mapping example below.

Mapping example. Assume that the service received the following events:
"User1" connected to "site 1" on November 1
"User2" connected to "site 1" on November 5
"User3" connect to "site 1" on November 27
"User3" connect to "site 1" on November 28
"User4" connect to "site 2" on November 29
  Then the service will maintain the following mappings:
"site 1": {"user 1": November 1, "user2": November 5, "user3": November28, "user4": null}
"site 2": {"user1": null, "user2": null, "user3": null, "user4": November 29}
"site 3": {"user1": null, "user2": null, "user3": null, "user4": null}
  Usage Calculation
The usage of "site1" on November 28 is 3 ("user1", "user2", "user3")
The usage of "site2" on December 15 is 1 (only "user 3").
The usage of "site2" on November 28 is 0.
The usage of "site2" on November 30 is 1 ("user4").
The usage of "site 3" is always 0.

Frequency calculation. In this example, the frequency of a certain usage is defined to be a mapping from a certain usage, to the number of resources having this usage value. A rapid way to extract it is by calculating the usage of each resource, generate a frequency mapping, and produce a frequency table from it. Specifically, continuing with the example above yields the following frequency on November 30:
Frequency(usage 0)=1 ("site 3):
Frequency(usage 1)=1 ("site 2")
Frequency (usage 2)=0 (no site has a Usage of 2)
Frequency (usage 3)=1 ("site 1")

Continuing this example, the accumulated frequency of a certain usage is defined to be the aggregated sum of all usage values smaller or equal to it, multiplied by their frequencies. This can be readily extracted from the frequency values mentioned above. For instance:
Accumulated Frequency (usage 0)=0*1=0
Accumulated Frequency (usage 1)=0*1+1*2=2
Accumulated Frequency (usage 2)=0*1+1*2+2*0=2
Accumulated Frequency (usage 3)=0*1+1*2+2*0+3*1=5

Under this example and approach, for each organization, usage is accumulated by a resource, and depends on the time where it was calculated. Frequencies and Accumulated Frequency values are defined on a resource type, and each depends on the time they were calculated.

Some embodiments define rarity. An action may be defined as an event performed by a user in a certain time, containing a resource. For example:
action 1: "user 1" browsed to "site 1" on November 1. (time: November 1, username: "user 1", resource: "site 1" (site 524)).
action 2: "user 2" connected to "server1" on December 1 (time: December 1, user name: "user 2", resource: "server1" (a server 502)).

Keeping in mind that each action contains a resource and a time, an embodiment may define the commonality of an action as the probability that the action's resource will be used by any user in the particular time where the action was performed. An action will be considered rare if its commonality value is low. An embodiment may define 914 the popularity of certain resource by a numerical value from 0 to 1 which reflects its rarity or commonality in the organization, as follows:
A low popularity value indicates that the action is considered to be rare.
A high popularity value indicates that the action is considered to be common.
A zero popularity value indicates that an action was not performed in the organization in the past month (or whatever time period is used).

In further exploration of technical advantages of the present teachings, consider a comparison of two methods for evaluating the popularity of resources in an organization. Assume the resource type of interest is collaboration sites, and usage of interest is for a specified period, e.g., the most recent thirty days. Assume also that the usage is quantified as a count of distinct users during the specified period, with ten thousand sites denoted here as "a1" through "a10000" each having a usage of 1, one site denoted here as "b" having a usage of 500, and one site denoted here as "c" having a usage of 1000 (10,002 sites total).

A PopularityV1(x) measure for a resource x belonging to a specified collection (e.g., all resources of the same type as resource x) may be defined as the usage for resource x divided by the usage of the most used resource in the same collection as resource x. Another way to say this is the usage frequency of x divided by the maximum over resources in x's collection of the respective usage frequencies of those resources in x's collection. Note that this is one of the two ways discussed herein of defining PopularityV1(x), the other definition has similar disadvantages to those discussed in this example.

So for the example at hand, one has:
PopularityV1("a1")=frequency("a1")/frequency("c")=1/1000=0.001
PopularityV1("b")=frequency("b")/frequency("c")=500/1000=0.5
PopularityV1("c")=frequency("c")/frequency("c")=1000/1000=1

An advantage of this PopularityV1(x) method is that it is easy to calculate. However, it has at least two disadvantages.

First, this approach doesn't take into account the frequencies distribution. The fact that there are 10000 sites with usage=1 (frequency(usage1)=10000) is completely ignored. This approach gives a significantly low popularity score to sites with usage 1, despite the fact that a low usage is quite common in the organization. Second, the value generated by this model is not very informative. One may know that in general low values represent low commonality and high values represent high commonality, but the relations and the meaning of the PopularityV1(x) values do not add significantly to that.

By contrast, a PopularityV2(x) approach as taught herein may provide clear advantages. First, it takes into account the full frequency distribution, by using an accumulated frequency. This makes the family of PopularityV2(x) methods more adaptive to various behaviors which may appear in various organizations. Second, PopularityV2(x) is defined by a probabilistic function, which tracks the probability of a certain action to be performed. Thus, each value generated by the model has a meaning, in that it describes the probability of an action to be performed.

Some members of the PopularityV2(x) family of resource popularity assessment approaches may be described using terms with the following definitions. However, this does not exclude or constrain the other PopularityV2(x) examples and teachings provided herein.

In this current example, "Users" means by the set of users in an organization. An "Action" is a pair (u, r) in which u represents a user in a particular collection of users and r represents a resource in a particular collection of resources. A set "Actions" (plural) which is the set of actions performed in an organization in the past month (for instance) may be written as {(u, r)|u∈Users, r∈Resources}. The usage of an action (u, r) may be defined by the usage of its resource: usage((u, r))=usage(r).

In this context, some embodiments use this PopularityV2( ) definition:

$$PopularityV2(r)=P((u,r)|Usage((u,r'))<=Usage(r))$$

$$=|\{(u,r')|(u,r')\in Actions, r'\in Resources, Usage(r')<=Usage(r)\}|/|Actions|$$

=sum from usage'=0 to usage(r) of usage' times frequency(usage')/sum from usage'=0 to infinity of usage' times frequency (usage')

=accumulated frequency(usage(r))/accumulated frequency(max usage)

Looking back from a PopularityV2( ) to V1 approaches, one can define a set of transitions. Under a first transition, the popularity of each resource r is defined by the probability of an action with a smaller or equal frequency value to appear. Under a second transition, this can be calculated by counting the amount of Actions with accumulated frequency of r, and dividing it by the total amount of actions. Under a third transition, the ratio numerator and denominator can be derived from a frequency table (e.g., a table listing resources and their respective usage values). As to the denominator, the amount of actions can be extracted by summing up the distinct frequency values, multiplied by total amount of resources having this value. As to the numerator, it is similar to the denominator, only that in this case one stops the summation when reaching a frequency value larger than the frequency of r (for the relationship condition <=). Under a fourth transition, note is taken that the denominator and numerator can be expressed by accumulated frequency.

Continuing the example with the 10,002 sites as the resources, under a PopularityV2( ) approach one has the following:

accumulated frequency(usage(a1)
=accumulated frequency(1)
=1×10000
=10000
accumulated frequency(usage(b)
=accumulated frequency(500)
=1×10000+500×1
=10500
accumulated frequency(usage(c)=
accumulated frequency(1000)
=1×10000+500×1+1000×1
=11500
Thus,
PopularityV2(a1)
=accumulated frequency(usage(a1))/accumulated frequency(max usage)
=10000/11500
=0.869
PopularityV2(b)
=accumulated frequency(usage(b))/accumulated frequency(max usage)
=10500/11500
=0.913
PopularityV2(c)
=accumulated frequency(usage(c))/accumulated frequency(max usage)
=11500/11500
=1.000

Notice that V2 popularity value for the site a1 is significantly higher than evaluated in the popularity v1 case, due to the fact that the V2 approach takes into account the frequencies distribution.

In some embodiments, a log scale is used to create a more gradual distribution of results, and to be less strict with low results. Thus, the numerator and denominator may each be computed as above, but then the log (or ln) of each is taken, so the ratio is actually a ratio of logarithmic values.

One utilization of popularity assessments is to detect anomalies, e.g., actions which do not typically happen in an organization, and when they do happen, a flag or other alert is raised. The question of what is considered to be anomalous can be answered using probability: actions with a low probability to appear are anomalous. A Popularity V2 approach may be derived from a probability function, and can therefore indicate what is considered anomalous and what is not. For example, resources with a popularity V2 value which is smaller than 0.05, have less than 5% probability to occur. In the sites example above, the site "a1" has popularity value of 0.869. In other words, it has an 86.9% likelihood, and therefore is not anomalous. In the Popularity V1 approach, however, a popularity value is not derived from a probabilistic function, so it is unclear how to detect anomalies by employing only V1 popularity values.

Some Efficiency Considerations

Calculating the popularity of a resource having a certain resource type may depend on the accumulated frequencies for usages of resources with this same resource type. In some embodiments, this involves fetching the Usage of all resources whenever the calculation is performed. For example, in order to calculate the popularity of a certain site 524, an implementation may fetch the usage of each and every site used in the organization. But this would be time consuming, since the popularity calculation is performed in high rates.

One efficiency-optimized solution samples the usages of all resources only in case of change. This is an estimation technique, which does not provide the actual usage counts, because usage is defined in a sliding window. So yesterday's usage will not be today's usage if no events were seen today. A decay model 604 defines how old usage data (data retrieved in previous days) should be accounted for. For example, one implementation uses a linear decay model, which assumes that the usage pattern is distributed evenly across the previous month. This implementation employs the following Interpolation model:

UpdatedUsageValue=(1–"total days passed since oldUsageValue"/30 days in window)*oldUsageValue However, the decay model used is configurable. It may be modified according to the behavior observed in each organization, and depending on the resource type. For instance, assume a site has a Usage of 100 (i.e., 100 distinct users used this site in the past 30 days). Suppose that after 15 days an enhanced system 202 is to retrieve the usage of the site. An inefficient way would be to calculate the usage from scratch. According to a decay module technique, however, the system can estimate the current usage value to be 50, by linear interpolation function defined above: (1−15 days/30 days) *100 users=50 users.

More generally, some embodiments described herein may be viewed by some people in a broader context. For instance, concepts such as attention, change, discovery, pure logic, or pure mathematics may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to efficiently assess resource popularity based on usage distribution across hundreds of resources in a computing environment. Other configured storage media, systems, and processes involving attention, change, discovery, pure logic, or pure mathematics are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples and scenarios, operating environments, performance criteria, software processes, identifiers, data structures, data formats, notations, control flows, naming conventions, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
IaaS or IAAS: infrastructure-as-a-service
ID: identification or identity
IP: internet protocol
LAN: local area network
OS: operating system
PaaS or PAAS: platform-as-a-service
RAM: random access memory
ROM: read only memory
TCP: transmission control protocol
TPU: tensor processing unit
UBA: user behavior analytics
UEBA: user and entity behavior analytics; UEBA and UBA are used
interchangeably herein
UEFI: Unified Extensible Firmware Interface
URL: uniform resource locator
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. Security proxies may be implemented with services or accessed via services, for example.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Resource popularity assessment operations such as file reads and network 108 communications to obtain 902 resource usage data 214, processor 110 and memory 112 operations to form 908 accumulations 318 and ratios 316 and to test data 118 for compliance with a relationship condition 324, automatic utilization 912 of computed 914 popularity assessments 304 within monitored systems 130, and many other operations discussed herein, are understood to be inherently digital. A human mind cannot interface directly with a CPU or other processor, or with RAM or other digital storage, to read and write the necessary data to perform the resource popularity assessment activity (e.g., computation 914, utilization 912) steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/ or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accumulating, assigning, computing, determining, employing, enhancing, forming, getting, grouping, obtaining, satisfying, scaling, summing, utilizing (and accumulates, accumulated, assigns, assigned, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as a "computational system" or "computing system", and when in a network may be referred to as a "node"

104 users, e.g., an analyst or other user of an enhanced system 202

106 peripherals 108 network generally, including, e.g., clouds, local area networks (LANs), wide area networks (WANs), client-server networks, or networks which have at least one trust domain enforced by a domain controller, and other wired or wireless networks; these network categories may overlap, e.g., a LAN may have a domain controller and also operate as a client-server network 110 processor 112 computer-readable storage medium, e.g., RAM, hard disks 114 removable configured computer-readable storage medium 116 instructions executable with processor; may be on removable storage media or in other memory (volatile or non-volatile or both)

118 data 120 kernel(s), e.g., operating system(s), BIOS, UEFI, device drivers 122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, autocompletion software, simulators, fuzzers, repository access tools, version control tools, optimizers, collaboration tools, other software development tools and tool suites (including, e.g., integrated development environments), hardware development tools and tool suites, diagnostics, browsers, and so on 124 applications, e.g., word processors, web browsers, spreadsheets, games, email tools, commands 126 display screens, also referred to as "displays"

128 computing hardware not otherwise associated with a reference number 106, 108, 110, 112, 114

202 enhanced computing system, e.g., one or more computers 102 enhanced with resource popularity assessment and utilization functionality 204, or computers which perform a method 900 or 1000

204 resource popularity assessment and utilization (RPAU) functionality, e.g., functionality which does at least one of the following: computes a popularity assessment as a ratio of accumulations using a relationship condition, computes a PopularityV2( ) assessment, conforms with the FIG. 10 flowchart or its constituent flowchart 900, or otherwise provides capabilities first taught herein 206 popularity value; an example of a popularity assessment 304

208 rareness value; an example of a popularity assessment 304

210 resource in a computing environment 100

212 resource usage value, e.g., quantification of usage of a resource 214 resource data, including, e.g., resource IDs and associated resource usage values; may also include metadata such as resource usage value age 602

216 resource popularity assessment utilizer, e.g., a device 102 or system 102 or software 120, 122, 124 that utilizes a popularity assessment 304 to track or enhance usability, security, or another aspect 310

302 resource popularity assessment and utilization; includes assessment of a resource's popularity, utilization of a resource popularity assessment, or both 304 resource popularity assessment; refers to computational operations to compute an assessment, or to the resulting assessment (digital value) itself, or both, according to context (e.g., whether verb or noun fits context)

306 RPAU software, e.g., software which provides RPAU functionality 308 interface to a monitored system which is configured to receive an assessment 304 for utilization in enhancing 1022 the monitored system; an example of an interface 314

310 enhanceable aspect of a system 102

312 security enhancement, e.g., an enhancement which improves a system 102 with respect to data confidentiality, data integrity, data availability, incident recovery, security risk mitigation, regulatory compliance, or privacy 314 interface generally; may include hardware such as network interface cards, software such as network stacks, APIs, or sockets, ensemble items such as network connections, or a combination thereof 316 ratio, e.g., a computational result of a numerator value divided by a denominator value 318 accumulation, e.g., generally a computational result of summing or multiplying multiple values (in special cases some accumulations reduce to a single value)

320 nonconforming subset, e.g., a portion or all of a set of usage values 212 which is formed without regard to whether each member of the nonconforming subset conforms to a specified relationship condition 324

322 conforming subset, e.g., a portion of a set of usage values 212 in which each member of the conforming subset conforms to a specified relationship condition 324

324 relationship condition on usage values 212

402 usability of a system 102; may be measured, e.g., by user satisfaction polls, transaction or other interaction statistics, breadth of adoption, awards or other commercial recognition; may be enhanced, e.g., by promoting speed or prominence of resources that are more popular, or reducing speed or prominence of resources that are less popular, or both 404 security of a system 102; may be measured, e.g., by breach or other security incident frequency or magnitude; may be enhanced, e.g., by treating unusual (rare or unpopular) events with greater scrutiny, e.g., more authentication requirements, alerts to urge investigation, more detailed logging 406 functionality of a system 102; may be measured, e.g., by absence or presence of particular options in a user interface, or by the computational requirements for performing operations in response to user commands; may be enhance, e.g., by adding options for interaction with more popular resources, or reducing options for interaction with less popular resources, or both 408 effectiveness of a system 102; may be measured, e.g., by performance criteria, statistics on repeated attempts to perform a given operation until it succeeds or the user gives up, or in terms of other aspects such as usability, security, functionality; may be enhanced, e.g., by redesigns or bug fixes or other program adjustments that decrease repeated attempts to perform a given operation, or by enhancing aspects such as usability, security, functionality 410 resource usage efficiency of a system 102; may be measured, e.g., by correlation of computational resource usage with resource popularity; may be enhanced, e.g., by system changes that increase the correlation so that fewer resources are dedicated to less popular resources 502 file server 504 cloud-based resource, e.g., any resource 210 accessed via or residing within a cloud; some examples include SaaS, PaaS, IaaS services, an Azure® resource, AWS® resource, or another resource 210 made publicly available by a cloud service provider (marks respectively of Microsoft Corporation, Amazon Technologies, Inc.)

506 user-consumable service, e.g., any service that has a interface 314 visible to a user 104

508 web browser; may be a particular browser instance, or a browser category, e.g., Chrome®, Firefox®, Microsoft Edge®, etc. (marks respectively of Google, LLC, Mozilla Foundation, Microsoft Corporation)

510 residence country of a resource 210, e.g., country in which a resource user resides, as determined for example from an IP address 512 residence region (e.g., Europe, GDPR) of a resource 210, e.g., geographic or regulatory region in which a resource user resides 514 user action property 516 resource access country of origin, e.g., country from which a resource access originates 518 resource access region of origin, e.g., geographic or regulatory region from which a resource access originates 520 internet service provider, cloud service provider, or other networked resource service provider 522 any compute resource, storage resource, or network resource not otherwise designated herein 524 collaborative platform site, e.g., a SharePoint® site, Figma® site, Slack® site, or other networked collaboration tool interface (marks respectively of
Microsoft Corporation, Figma, Inc., Tiny Speck, Inc.)

602 age of resource usage data, e.g., timestamp or time range 604 decay model; may be implicit in implementation software and data 606 count of distinct users of a resource 608 amount of memory 112 used 610 duration of resource usage, e.g., one week, two hours, etc.

612 frequency of resource usage, e.g., number of times per week 614 recency of resource usage, e.g., within past thirty days 616 I/O operation 618 count of I/O operations 620 processor 110 cycle 622 count of processor cycles used 624 transaction, e.g., in a financial or online commerce system 626 count of transactions 628 network bandwidth 630 amount of bandwidth 628 used 632 numbers generally (assumed digital), e.g., an integer or float 634 number range, e.g., as defined by two endpoint numbers and indication which endpoints if any the range includes 636 enumeration value, e.g., low/medium/high, or Boolean 638 scaling function (digital implementation)

640 group of resources 210; may be defined, e.g., by a shared resource type, ownership, age, or other criteria 702 SIEM, e.g., tool which provides security information and event management functionality 704 cloud access security broker, e.g., tool which provides security functionality for accesses to cloud-based resources 706 intrusion detection system or intrusion prevention system 708 behavior analysis engine, e.g., tool which analyzes access attempts in a computing environment to detect for behavioral patterns 710 anomaly, e.g., unusual event or unusual behavior which may indicate a security breach attempt or a security breach 712 anomaly detection system e.g., tool which detects anomalies 710

800 examples of tools, subsystems, and operational tasks which may advantageously utilize a resource popularity assessment 802 anomaly detection; an example of cybersecurity risk management 804 cybersecurity risk management 806 resource access prioritization; an example of resource management 808 memory allocation; an example of resource management 810 resource management 812 processor allocation; an example of resource management 814 enhanceable aspect monitoring, e.g., monitoring the status of an aspect 310 or operations designed to alter such status 816 bandwidth allocation; an example of resource management 900 flowchart; 900 also refers to RPAU methods illustrated by or consistent with the FIG. 9 flowchart 902 obtain resource usage data; performed computationally, e.g., by file reads, network transmissions, event log parsing, etc.

904 get resource selection; performed computationally, e.g., by selecting next resource in a schedule, or performed by prompting a user and receiving selection through a user interface 906 resource selection, e.g., selection of a resource x whose PopularityV2(x) will be computed 908 form subsets; performed computationally; not performable by mental activity alone due to need to obtain 902 data, number of resources, storage of resource data in digital form, etc.

910 assign resource popularity assessment; involves computing 914 an assessment 304 and providing it as a computed digital value, e.g., through an interface 314

912 utilize resource popularity assessment 914 compute 914 an assessment 304 as a ratio of accumulations 318 using a relationship condition 324

1000 flowchart; 1000 also refers to RPAU methods illustrated by or consistent with the FIG. 10 flowchart (which incorporates the steps of FIG. 9)

1002 computationally apply a scaling function 638 to an accumulation 1004 computationally group resources according to their type 1006 resource type, e.g., one of the examples 502-522 or another type 1008 computationally determine inclusion or exclusion of usage data 214 during an assessment computation 914

1010 computationally employ a decay model 604 during an assessment computation 914

1012 computationally sum (add) usage values 212 during an assessment computation 914

1014 through computation determine that at least a specified number N of method characterizations are satisfied during an assessment computation 914

1016 assessment method characterization listed in claim 18 of the present patent document as originally filed with a Patent Office 1018 through computation determine that a performance criterion 1020 is satisfied 1020 performance criterion listed in claim 17 of the present patent document as originally filed with a Patent Office 1022 enhance a technical aspect 310 of a system 102 by utilizing an assessment 304

1024 any step discussed in the present disclosure that has not been assigned some other reference numeral

CONCLUSION

In short, the teachings herein provide a variety of RPAU functionalities 204 which operate in enhanced systems 202. Embodiments assess computing environment 100 resource 210 popularity 206 or rareness 208, using a computed 914 ratio 316 of accumulations 318 of resource usage values 212 and a relationship condition 324, thereby providing inputs 304 as guidance for automatic system enhancement utilizations 800 such as anomaly detection 802, resource management 810, and access or maintenance prioritization 806. Unlike V1 approaches that base resource popularity on at most two resource usage values, the V2 assessment approaches 1000 taught herein consider a distribution of usage values 212 across an entire group 640 of resources (which in some cases includes all resources 210 of a single type, or a single owner, or a single cloud, or all resources for which data 214 is available), thereby providing finer grained actionable results. Usage value accumulations 318 may be scaled 1002. Popularity 206 or rareness 208 of one or more resources 210 of various types 1006 may be determined 914. A cache or other decay model 604 may be employed 1010 to optimize assessment efficiency by reducing usage value 212 retrieval I/O transactions. Specific utilizations 800, 216 of resource popularity assessments 304 for enhancing 1022 system usability 402, security 404, functionality 406, and effectiveness 408 are discussed.

Embodiments are understood to also themselves include or benefit from tested and appropriate security controls and privacy controls such as the General Data Protection Regulation (GDPR). Use of the tools and techniques taught herein is compatible with use of such controls. Nothing herein should be read as requiring a privacy violation.

Although Microsoft technology is used in some motivating examples, the teachings herein are not limited to use in technology supplied or administered by Microsoft. Under a suitable license, for example, the present teachings could be embodied in software or services provided by other vendors.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 9 and 10 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds or ranges, specific architectures, specific attributes, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system configured for characterizing relative resource usage, the system comprising:
   a digital memory;
   a processor in operable communication with the digital memory, the processor configured to perform resource usage characterization and management steps which include (a) obtaining digital resource usage data which associates resources of a monitored computing system with respective usage values, (b) getting a selection of a particular resource, the particular resource having an associated particular usage value, (c) forming a conforming subset and a nonconforming subset based at least in part on the resource usage values and on a relationship condition which depends on the particular usage value, the conforming subset including one or more resources whose resource usage values satisfy the relationship condition and the nonconforming subset including one or more resources whose resource usage values do not satisfy the relationship condition, (d) assigning the particular resource a popularity assessment which depends at least in part on a ratio between a first accumulation that is based on the one or more resource usage values of the conforming subset and a second accumulation that is based on the resource usage values of the conforming subset and the nonconforming subset, and (e) utilizing the assigned popularity assessment in at least one of the following ways: to enhance security of the monitored computing system through better anomaly detection, to enhance efficiency of the monitored computing system through redesign or removal of an unpopular resource, to enhance usability of the monitored computing system through a change in resource speed or resource prominence, or to enhance effectiveness of the monitored computing system by decreasing repetition of attempts to perform an operation.

2. The computing system of claim 1, wherein the resources comprise at least one of the following:
   a web-based collaborative platform site;
   a file server;
   a computer;
   a cloud-based resource; or
   a user-consumable service.

3. The computing system of claim 1, wherein the resources comprise at least one of the following:
   a resource access country of origin or a resource access region of origin;
   a resource country of residence or a resource region of residence;
   an operating system or other kernel;
   an internet service provider;
   a category of web browser;
   a particular web browser; or
   a unique property which describes a user action.

4. The computing system of claim 1, wherein at least some of the resource usage data has an associated age, and wherein the computing system comprises a decay model which is configured to determine inclusion or exclusion of resource usage data based at least in part on resource usage data age.

5. The computing system of claim 1, further comprising at least one of the following:
   a security information and event management tool which utilizes the assigned popularity assessment;
   a cloud access security broker which utilizes the assigned popularity assessment;
   a user and entity behavior analysis engine which utilizes the assigned popularity assessment;
   an intrusion detection system which utilizes the assigned popularity assessment;
   an intrusion prevention system which utilizes the assigned popularity assessment; or
   an anomaly detection system which utilizes the assigned popularity assessment.

6. A method which characterizes relative resource usage and utilizes results to support or enhance technical operations, the method comprising:
   obtaining digital resource usage data which associates resources of a monitored computing system with respective usage values;
   getting a selection of a particular resource, the particular resource having an associated particular usage value;
   forming a conforming subset and a nonconforming subset based at least in part on the resource usage values and on a relationship condition which depends on the particular usage value, the conforming subset including one or more resources whose resource usage values satisfy the relationship condition and the nonconforming subset including one or more resources whose resource usage values do not satisfy the relationship condition;
   assigning the particular resource a popularity assessment which depends at least in part on a ratio between a first accumulation that is based on the one or more resource usage values of the conforming subset and a second accumulation that is based on the resource usage values of the conforming subset and the nonconforming subset; and
   utilizing the assigned popularity assessment to facilitate at least one of the following: anomaly detection, cybersecurity risk management, resource access prioritization, volatile memory allocation, non-volatile memory allocation, processor allocation, bandwidth allocation, or resource management.

7. The method of claim 6, wherein the method obtains digital resource usage data which associates resources of a monitored computing system with respective usage values that measure at least one of the following:
   distinct users of a given resource;
   users of a given resource, regardless of whether they are distinct users or not;
   duration of use of a given resource;
   frequency of use of a given resource;
   recency of use of a given resource;
   amount of volatile memory used;
   amount of non-volatile memory used;
   I/O operations;
   processor cycles;
   bandwidth; or
   number of transactions.

8. The method of claim 6, wherein the method is characterized in at least one of the following ways:
   numbers represent usage values;
   number ranges represent usage values;
   enumerations represent usage values;
   a number represents the popularity assessment;
   a number range represents the popularity assessment; or
   an enumeration value represents the popularity assessment.

9. The method of claim 6, wherein the relationship condition is satisfied by a given usage value when the given usage value is greater than or equal to the particular usage value.

10. The method of claim 6, wherein assigning the popularity includes scaling the first accumulation and scaling the second accumulation, the scaling performed according to a scaling function.

11. The method of claim 6, further comprising grouping resources into resource groups, and assigning different resource groups respective popularity values.

12. The method of claim 6, further comprising grouping resources into resource groups having respective resource usage value accumulations, and scaling resource usage value accumulations of different resource groups using respective scaling functions.

13. The method of claim 6, wherein forming the first accumulation includes summing the one or more resource usage values of the conforming subset, and forming the second accumulation includes summing the resource usage values of the conforming subset and the nonconforming subset.

14. The method of claim 6, wherein the method obtains digital resource usage data in which the usage values are associated with one or more respective time periods or points in time, and wherein the usage values which are employed while forming the conforming subset and the nonconforming subset are from a particular specified time period.

15. The method of claim 6, wherein at least some of the resource usage data has an associated age, and the method includes employing at least one of the following to determine inclusion or exclusion of resource usage data based at least in part on resource usage data age:
a linear interpolation decay model; or
an exponential interpolation decay model.

16. A computer-readable storage medium configured with data and instructions which upon execution by a processor cause a computing system to perform a method which characterizes relative resource usage in a computing environment, the method comprising:
obtaining digital resource usage data which associates resources of the computing environment with respective usage values;
getting a selection of a particular resource which is denoted here as R, the resource R having a usage value which is denoted here as RUsage;
dividing the resources of the computing environment into subsets based at least in part on the resource usage values and on a relationship condition which depends on the usage value RU, thereby forming a conforming subset and a nonconforming subset, the conforming subset including one or more resources whose resource usage values satisfy the relationship condition and the nonconforming subset including one or more resources whose resource usage values do not satisfy the relationship condition;
assigning the resource R a popularity which is denoted here as RPopularity, where RPopularity depends at least in part on a ratio between an accumulation denoted here as RConformingUsage based on the one or more resource usage values of the conforming subset and an accumulation denoted here as RAllUsage based on the resource usage values of the conforming subset and the nonconforming subset; and
utilizing the resource R popularity RPopularity in at least one of the following ways: to enhance security of the computing environment through better anomaly detection, to enhance efficiency of the computing environment through redesign or removal of an unpopular resource, to enhance usability of the computing environment through a change in resource speed or resource prominence, or to enhance effectiveness of the computing environment by decreasing repetition of attempts to perform an operation.

17. The storage medium of claim 16, wherein at least one of the following performance criteria is satisfied:
the digital resource usage data associates at least 90% of the resources of a given resource type in the computing environment with respective usage values;
the method assigns respective popularities to at least 90% of the resources of a given resource type in the computing environment; or
the method assigns respective popularities to at least 90% of the resources of a given resource type in the computing environment at least once every hour.

18. The storage medium of claim 16, wherein the method is further characterized by at least two of the following method characterizations:
the method obtains digital resource usage data which associates resources of a monitored computing system with respective usage values that measure distinct users of a given resource;
the relationship condition is satisfied by a given usage value when the given usage value is greater than or equal to the usage value RU;
assigning the popularity RPopularity includes scaling the first accumulation and scaling the second accumulation, the scaling performed according to a log scaling function;
forming the first accumulation RConformingUsage includes summing the one or more resource usage values of the conforming subset, and forming the second accumulation RAllUsage includes summing the resource usage values of the conforming subset and the nonconforming subset;
the method obtains digital resource usage data in which the usage values are associated with one or more respective time periods or points in time, and wherein the usage values which are employed while forming the conforming subset and the nonconforming subset are from a particular specified time period;
at least some of the resource usage data has an associated age, and the method includes employing a linear interpolation decay model to determine inclusion or exclusion of resource usage data based at least in part on resource usage data age.

19. The storage medium of claim 18, wherein the method is further characterized by at least three of the method characterizations.

20. The storage medium of claim 18, wherein the method is further characterized by at least four of the method characterizations.

* * * * *